Figure 5:
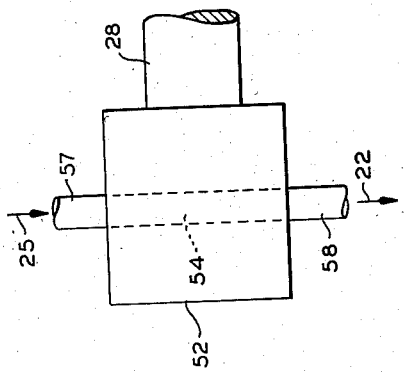

May 5, 1959      C. G. DE HAVEN      2,885,246

FEEDING DEVICE FOR PARTICULATE SOLIDS

Filed Feb. 13, 1956      3 Sheets-Sheet 1

INVENTOR.
C. G. DE HAVEN
BY Hudson & Young
ATTORNEYS

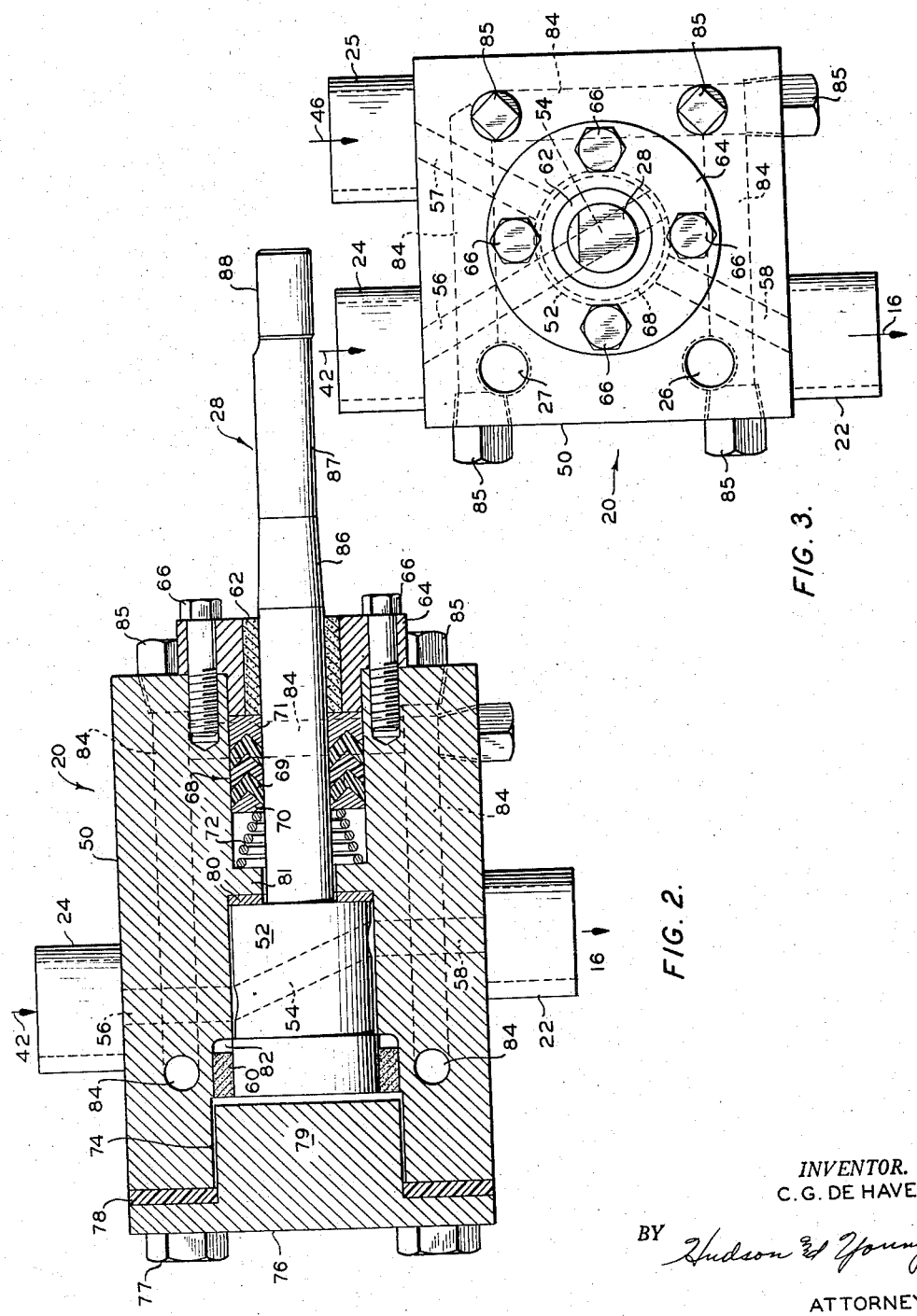

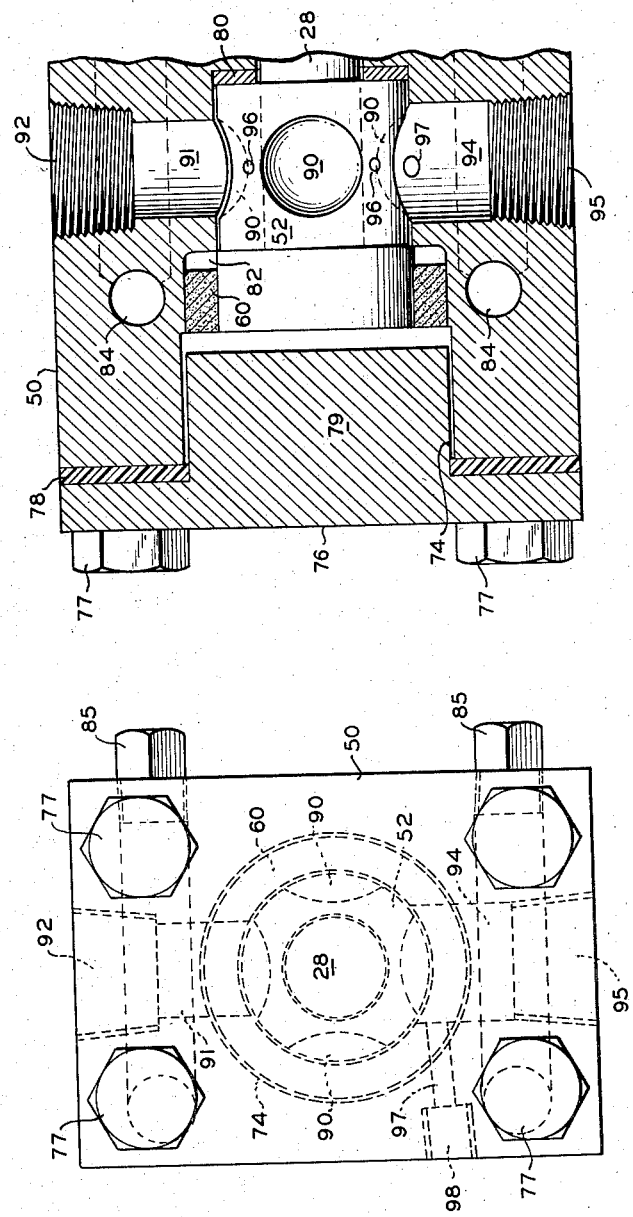

United States Patent Office 2,885,246
Patented May 5, 1959

2,885,246

FEEDING DEVICE FOR PARTICULATE SOLIDS

Clark G. De Haven, Bartlesville, Okla., assignor to Phillips Petroleum Company, a corporation of Delaware Application February 13, 1956, Serial No. 565,179

12 Claims. (Cl. 302—49)

This invention relates to an improved feeder for particulate solid materials. Another aspect of the invention pertains to a catalyst feeder for use in feeding particulate solid catalyst into a reactor. A further aspect of the invention is concerned with an arrangement of apparatus for feeding catalyst to a reactor at a regulated rate and effecting a catalytic reaction therein.

In numerous commercial processes, there is a need for an efficient device for feeding solid particulate material at a regulable rate. An illustration of such a process is in the feeding of particulate solid catalyst into a catalytic reaction zone at a regulated rate to effect a continuous process. A process in which the invention is particularly applicable is disclosed in the copending application of J. P. Hogan and R. L. Banks, entitled "Polymers and Production Thereof," Serial No. 476,306, filed December 20, 1954, now abandoned, and in the copending application of J. P. Hogan and E. R. Francis, entitled "Method for Production of Solid Polymers of Olefins," Serial No. 445,-042, filed July 22, 1954, now abandoned. In the disclosed processes, chromium oxide-containing solid particulate catalyst is fed into a continuous polymerization zone along with a suitable liquid diluent and the olefin to be polymerized. The polymerization zone is maintained under superatmospheric pressure and at temperatures in the range of about 100 to 450° F. In the polymerization of ethylene, a preferred method of operation is at a pressure of about 450 p.s.i.g. and a temperature of about 300° F.

The feeder of this invention is designed specifically for the feeding of particulate solid catalyst, such as chromium oxide deposited in minor amount on silica-alumina carrier or support, to an olefin polymerization reactor in accordance with the processes disclosed in the above-identified application. However, the device is broadly applicable to feeding of other particulate solids at a regulable rate to a treating zone where the solid material is to be utilized. An application of this nature comprises the feeding of solid adsorbent such as activated carbon or silica gel to a continuous fluid adsorption process.

The principal object of the invention is to provide a particulate solids feeder which feeds solids at a regulable rate. Another object is to provide an improved particulate solids feeder which is readily disassembled for cleaning and includes flushing means. A further object is to provide a rotary particulate solid catalyst feeder which contains catalyst material only a minor proportion of a revolution of the feeder cylinder. Another object is to provide a rotary particulate solid catalyst feeder having heat exchange means to adapt the feeder for use in a system for polymerizing olefins to normally-solid polymer. It is also an object of the invention to provide an arrangement of apparatus for feeding particulate solid catalyst at a controlled rate to a catalytic process, such as the polymerization of 1-olefins to normally solid polymer. Other objects of the invention will become apparent upon consideration of the accompanying disclosure.

The feeder of the invention comprises a feeder cylinder having pockets or cavities therein mounted on a rotatable shaft and enclosed in a housing thru which one or more inlets lead to the pockets or cavities in the feeder cylinder, preferably at a position above the cylinder, and thru which an outlet conduit also leads to the pockets or cavities, preferably below the cylinder. The cylinder pockets or cavities may be one or more in number and may extend only part way into the cylinder or may extend completely thru the cylinder. In rotating the cylinder, the pockets or cavities therein pass the inlet conduit for particulate solids and are filled during this phase of rotation and in the reverse manner are emptied into the outlet conduit as they rotate past the same. In an embodiment using a cavity extending thru the cylinder emptying the cavity involves rotating the cylinder only a minor portion of a cycle to align the cavity with an outlet conduit on the opposite side of the housing. In order to effect positive evacuation of the solid material, conduit means for injecting a suitable fluid into the solids cavity is provided.

Figure 4:
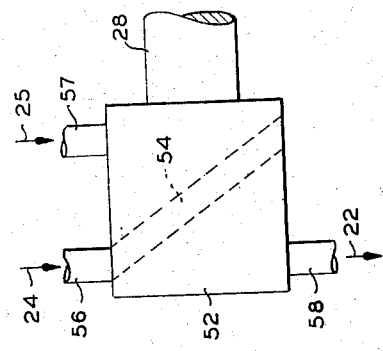
Figure 6:
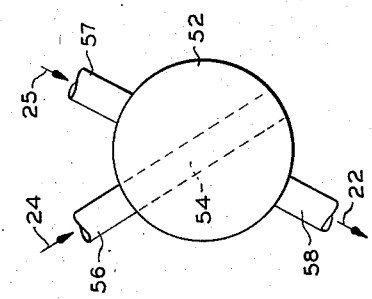
Figure 1:
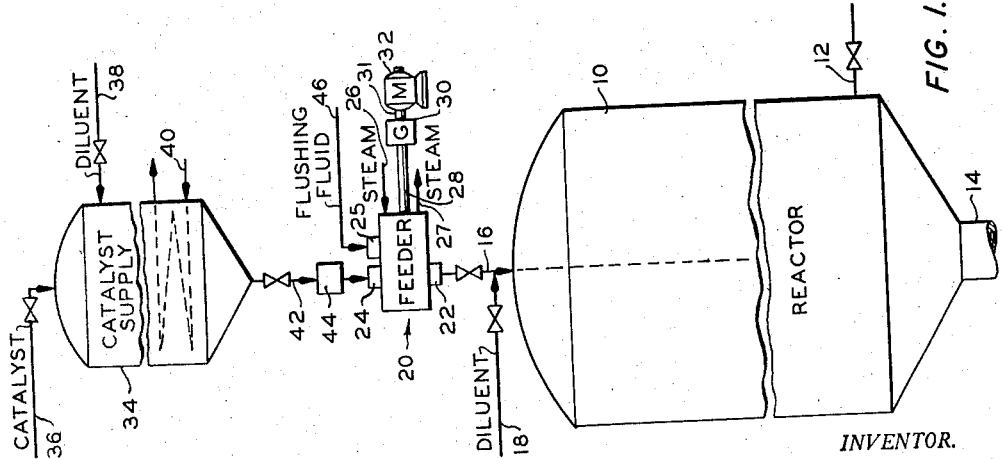

These and other features of the invention will be more readily understood from a consideration of the accompanying schematic drawing of which Figure 1 is a flow diagram showing one arrangement of apparatus in accordance with the invention; Figure 2 is a partial longitudinal cross-section of one embodiment of the feeder; Figure 3 is an end elevation of the feeder of Figure 2; Figure 4 is a side elevation of another embodiment of the feeder; Figure 5 is a fragmentary elevation of another embodiment of the feeder; Figure 6 is an end elevation of the feeder of Figure 5; Figure 7 is a fragmentary elevation in partial section of still another embodiment of the feeder; and Figure 8 is an end elevation of the feeder of Figure 7. Corresponding elements of the various figures are correspondingly numbered.

Referring to Figure 1, a catalytic reactor 10 is provided with a feed inlet line 12, a product and catalyst outlet 14, and an inlet 16 for a catalyst and diluent and/or flushing fluid. Line 18 feeds liquid diluent into line 16 for delivery to the reactor. Catalyst feeder 20 is connected thru its outlet 22 to line 16 and is provided with catalyst inlet conduit 24 and flushing fluid inlet 25. Conduits 26 and 27 connect with a circuit of heat exchange conduits within feeder 20 for circulation of heat exchange fluid, such as steam, therethru. Feeder shaft 28 connects with a gear box 30 (speed reducer), which in turn is operatively connected by means of shaft 31 to a motor 32.

Catalyst for the system is stored in tank or hopper 34 which is provided with catalyst supply line 36 and diluent supply line 38, as well as heat exchanger 40. Catalyst tank 34 is connected by line 42 to inlet 24 on feeder 20. A catalyst feed rate gauge 44 is positioned in line 42 in order to provide a check on the rate of feeding effected by feeder 20. Gauge 44 may comprise a Jerguson gauge or other type feed rate gauge. Flushing fluid is introduced to inlet 25 of the feeder via line 46 which connects with a flushing fluid supply tank, not shown.

The system shown in Figure 1 is provided with means, not shown, for maintaining the entire system including catalyst tank 34, feeder 20, reactor 10, and connecting lines under pressure maintained in the reactor which, in one specific application, is of the order of 450 p.s.i.g. This renders the catalyst feeding step of the process less difficult than it would be without maintaining adequate pressure in the feeder. The chromium oxide polymerization catalyst is very susceptible to poisoning or deactivation by contact with numerous fluids and gases; hence, the catalyst is delivered to tank 34 under the pressure therein and diluent used in the process in reactor 10 is added thru line 38. The preferred diluent for use in polymerization of 1-olefins, such as ethylene and/or propylene, is cyclohexane, although other cycloparaffins and heavier straight chain paraffins are also operable. Only enough diluent is added to tank 34 to cover the catalyst after which most but not all of the diluent is vaporized by heat supplied thru heat exchanger 40 so that the catalyst mass contains occluded diluent as it passes to feeder 20. This step removes occluded gases and vapors from the catalyst so as to free the same of contaminating materals before it is fed to the reactor. Diluent added thru line 18 is essential to the catalytic process effected in reactor 10 and by introduction in line 16 assists in flushing the catalyst into the reactor.

Referring to Figure 2, feeder 20 comprises a housing 50 enclosing a cylinder 52 and a portion of shaft 28 which is connected with cylinder 52. The solids cavity or pocket 54 in cylinder 52 comprises a conduit extending obliquely thru the axis of the cylinder and opening into the cylindrical surfaces at opposite sides of the cylinder. In this manner as the cylinder is rotated, the ends of cavity 54 rotate thru spaced-apart planes perpendicular to the axis of the cylinder. A pair of inlet conduits, one of which, 56, is shown in this view, pass thru the upper section of the housing with their lower ends in the same plane as the plane of rotation of one end of cavity 54 (the other inlet conduit 57 being shown on Figure 3). An outlet conduit 58 is positioned in the lower section of the housing one end coinciding with the opposite end of cavity 54 as it rotates thru the lower section of the housing and the other end with outlet connector 22 leading to line 16. It will be noted in the discussion of Figure 3 that when cavity 54 is in alignment with inlet conduit 56, the opposite end of cavity 54 is not in alignment with outlet conduit 58 but is blind and must be rotated thru about sixty degrees in order to align with outlet conduit 58 for delivery of catalyst.

The end section of cylinder 52 opposite shaft 28 is slightly larger (about .013 inch) than the rest of the cylinder and a bearing 60 is provided at this point in housing 50 for support and alignment of the cylinder. Bearing 60 is necessarily of the self-lubricating type where the feeder is to be used in feeding chromium oxide catalyst to a polymerization process because of the danger of contamination of the catalyst being fed thru the cylinder by lubricating oil commonly utilized to lubricate such a bearing. The other support bearing 62 for the shaft-cylinder assembly is positioned in a removable bearing plate 64, which is attached directly to the end of the housing by bolts or cap screws 66. In view of the internal superatmospheric pressure in the feeder, the device is provided with a seal 68 comprising Chevron type packing rings 69 positioned between male packing adapter 70 and female packing adapter 71. The seal assembly also includes compression spring 72 which constantly exerts a selected pressure on the Chevron type packing rings 69 so as to provide an effective seal around shaft 28 and the housing recess surrounding the seal assembly. It should be readily apparent that the packing seal requires no adjustment and is rendered positively operable by merely pulling bearing plate 64 into firm position against the end of the housing by tightening bolts or cap screws 66. Packing rings 69 are preferably fabricated of a synthetic heat resistant polymer such as polytetrafluoroethylene, although these packing rings may comprise any effective packing material which withstands the internal temperature of the feeder, such as a temperature of 450° F., without unduly rapid deterioration. Male packing adapter 70 is preferably fabricated from metal, such as brass, or other strong relatively inflexible material. Female packing adapter 71 may be fabricated of similar material to adapter 70 or of the same material as Chevron rings 69.

The end of housing 50 adjacent bearing 60 is provided with expanded opening 74 which is covered and sealed by means of cap 76, affixed to the housing by cap screws 77, and annular sealing gasket 78. Section 79 of cap 76 extends to within a fraction of an inch of the end of cylinder 52 so as to maintain the cylinder in the approximate position for operation until the feeder is placed under superatmospheric pressure, after which the excess pressure on the left end of cylinder 52 over atmospheric pressure on the outer end of shaft 28 keeps the piston in firm contact with a thrust bearing 80 which is supported firmly against section 81 of housing 50. Where the feeder is to be operated at atmospheric pressure, section 79 is made to fit more closely to the end of the cylinder feeder so as to serve as a thrust bearing. The thrust bearings are also self-lubricating.

Pockets 82, positioned axially between bearing 60 and the housing, function to collect powdered catalyst and polymeric material which may work along the cylinder surface during operation of the feeder so as to avoid contamination of the bearing surface of bearing 60 and thereby cause abrasion and/or sticking. Housing 50 is provided with internal conduits 84 comprising drilled passageways extending axially and transversely of the housing so as to provide a continuous, uninterrupted passageway from an inlet in one end of the housing to an outlet therein, as is apparent from a consideration of Figures 2 and 3. Plugs 85 are utilized to plug the ends of the drill holes thru which the passageways are formed.

Shaft 28 is provided with a tapered section 86 just outside of bearing 62 and section 87 of the shaft is of the same diameter as the smaller end of the tapered section so that in removing the cylinder-shaft assembly from the left end of the housing, any marks or roughness on the outside of the shaft on the exposed end section thereof do not scratch bearing surface 62 and also avoid damaging or displacing the Chevron seal assembly. The outer end of shaft 28 is provided with a flattened section 88 for engagement by means of a set screw in the coupling assembly (not shown) to gear box 30.

Referring to Figure 3, the end of housing 50 is provided with inlet and outlet conduits 26 and 27, respectively, which connect with a circuit of passageways 84 in the wall of the housing. Catalyst inlet conduit 56 is positioned radially about cylinder 52 and extends entirely thru the housing. Conduit 57 is positioned in the same plane as conduit 56 and is spaced apart therefrom at any desired spacing, preferably less than 90° therefrom. Outlet conduit 58 is similar to conduits 56 and 57 and is positioned 180 degrees from conduit 57 and is offset along the axis of cylinder 52 so that its end adjacent the cylinder is in the same plane perpendicular to the axis of the cylinder as the delivery end of cavity 54 so that conduit 58 aligns with cavity 54 when its upper end is aligned with conduit 57. In this manner, as cylinder 52 rotates clockwise (in Figure 3), the upper end of cavity 54 first passes in alignment with the lower end of conduit 56 and then in alignment with the lower end of conduit 57. When aligned with conduit 56, cavity 54 is filled with solid particulate material and the lower end of the cavity is blind, in view of the fact that it does not align with outlet conduit 58 in this position, and must be rotated to align with conduit 57 before a passageway is provided thru the cylinder from conduit 57 to conduit 58, in which case flushing fluid, such as cyclohexane, passes thru conduits 57, 54, and 58 to effect delivery of the solid material and flushing fluid to outlet 22 and to delivery line 16 connected thereto. Elements 24 and 25 are merely threaded nipples welded onto the housing for attaching to the various lines to which they are connected as shown in Figure 1. Other connector means, of course, may be utilized. It is not essential to the operation of the feeder to position conduits 56 and 57 in the same plane parallel with the end of housing 50 and perpendicular to the axis of cylinder 52, it being essential only that the lower ends of these conduits be positioned in the same plane as the inlet end of cavity 54. In the same manner, conduit 58 may be positioned in a plane parallel with the end of housing 50 or it may be in a plane oblique to the end of housing 50, it being essential only that the upper end of this conduit be in the same plane as the delivery end of cavity 54.

Figure 4 shows an arrangement of conduits 56, 57 and 58 in relation to oblique receiving cavity 54 which provides for filling and emptying cavity 54 once each revolution of cylinder 52. In this arrangement, conduits 56 and 57 are spaced apart axially in relation to cylinder 52 and in the same plane as the opposite ends of cavity 54; and conduit 58 is positioned in the same plane perpendicular to the axis of the cylinder as conduit 56 so that when the cylinder is revolved 180 degrees, the right end of cavity 54 aligns with conduit 57 and the left end of cavity 54 aligns with outlet conduit 58. In the position shown in Figure 4, cavity 54 is full and when it rotates 180 degrees, it is in direct alignment between conduits 57 and 58 for evacuation by injection of flushing fluid thru conduit 57.

Figures 5 and 6 show an arrangement of conduits 56, 57 and 58 in relation to cavity 54 which provides two cycles of the feeding operation for each revolution of cylinder 52. Cavity 54 is drilled in cylinder 52 on a diameter thereof and conduit 58 is diametrically opposite conduit 57 so that cavity 54 fills and is blind at the lower end when in alignment with conduit 56 and empties when rotated approximately 60 degrees into alignment between conduits 57 and 58. When the lower end of cavity 54, as observed in Figure 6, rotates 180 degrees, the cavity is filled again and then emptied upon rotation to alignment with conduits 57 and 58. This arrangement effects filling of cavity 54 from either end and therefore delivers twice as much material per revolution as the arrangement shown in Figures 2, 3, and 4.

The arrangement shown in Figures 7 and 8 is similar in some respects to that shown in Figure 2 in that shaft 28 and cylinder 52 are removable thru the left end of the housing. The cover arrangement for the left end of the housing is the same as that in Figure 2 and the cutaway section omits the shaft seal and bearing arrangement shown in Figure 2, but it is to be understood that such an arrangement is desirable in combination with the structure of Figures 7 and 8. The essential differences between the structure of Figure 7 and that of Figure 2 is in the type of cavity in cylinder 52 and the positioning of the inlet and outlet conduits together with the flushing conduit. The cavities 90 in cylinder 52 comprise two pairs of diametrically opposite dimples spaced 90 degrees apart in the form of a segment of a sphere cut by a cylinder. It is effective in evacuating cavities 90, if these cavities are formed so that they are of continuously decreasing cross section inward radially of the cylinder. It is, of course, feasible to utilize more or less than four cavities in the external surface of cylinder 52. These may be positioned symmetrically on the same circumference or two or more rows of cavities spaced apart longitudinally of cylinder 52 may be utilized in applications requiring a high feeding rate. Inlet 91 is threaded at 92 for attachment of a feeder conduit for catalytic materials and is preferably at least as large in diameter as cavity 90. Outlet conduit 94 is provided with threaded end section 95 and is larger in diameter than cavities 90 to facilitate emptying of the cavities when they are revolved to a position corresponding to this conduit. Cylinder 52 is hollow for a portion of its length to provide for insertion of shaft 28 which fits the cylinder closely and is held firmly in place by set screws 96. Conduit 97 opening into outlet conduit 94 from outside of the housing is positioned obliquely so as to be directed upwardly into each of rotating cavities 90 as they rotate thru alignment with conduit 94 so that a flushing fluid introduced thru conduit 90 effects positive evacuation of the cavities. In Figure 8, flushing conduit 97 is shown more clearly leading thru the housing obliquely so as to be directed upwardly into the cavities on cylinder 52. Conduit 97 is provided with a threaded expanded section 98 on the outer end for attachment to a supply line.

The feeder of the invention, in the various embodiments described, is operable without a flushing agent but, in many applications, the flushing agent is desirable and effective in achieving positive evacuation of the rotating cavity or cavities. In the polymerization process for which the feeder is specifically designed, the use of a hydrocarbon diluent which is non-deleterious to the particulate solid catalyst functions well as a catalyst evacuation agent and is also effective in the polymerization process in maintaining the 1-olefins to be polymerized in solution in the liquid phase. When feeding other particulate solids, it is feasible to utilize any desirable liquid or gas which is effective and non-deleterious in the process of feeding and also in the treating process to which the solid material is being fed.

In the polymerization of 1-olefins to solid polymer using supported chromium oxide catalyst in accordance with the processes of the heretofore identified applications, a catalyst feeder provided with a stainless steel housing and cylinder-shaft assembly was used to feed the catalyst. The housing was about 4″ square and about 6½″ long and enclosed a feeder cylinder 1½″ in diameter and 1 13/16″ long. Arrangement of apparatus was substantially that of Figure 1 and the feeder design was substantially that of Figures 7 and 8 (using the pressure sealing assembly shown in Figure 2 around the shaft). The shaft was ¾″ in diameter and extended about 7″ from the feeder cylinder and about 4″ outside of the housing. It had a 1″ long tapered section (1° of taper) outside of the housing beginning at the end bearing and the remainder of the shaft outside of the housing was of about .025″ smaller diameter than the main portion of the shaft.

The cavities in the feeder cylinder were in the form of a segment of a sphere cut by a cylinder and were ¾″ in diameter and ¼″ deep, there being four of them symmetrically arranged. The catalyst inlet in the top of the housing was ¾″ in diameter and the catalyst outlet in the bottom of the housing was 15/16″ in diameter. A flushing conduit 3/16″ in diameter, positioned as shown in Figures 7 and 8, was utilized to assist in evacuating the cavities using cyclohexane as flushing liquid.

The feeder described was utilized in feeding finely comminuted chromium oxide-silica-alumina catalyst to five, twenty, and sixty gallon liquid-phase reactors on separate runs of several months duration with outstanding success. On the five gallon size reactor the rotation rate of the feeder was in the range of 4 to 5 revolutions per hour, in the range of 17 to 19 r.p.h. on the twenty gallon reactor, and in the range of 50 to 55 r.p.h. on the sixty gallon reactor. Steam was circulated thru the heat exchange conduits of the feeder to maintain the internal temperature at about 300° F. to correspond with the reactor temperature, and a pressure of about 450 p.s.i.g. was maintained in the system, including the feeder.

A feeder of the design of Figures 2 and 3 was also constructed using a stainless steel housing and cylinder-shaft assembly of substantially the same size as the dimple-type feeder described above, except that the feeder cylinder was longer (2″ long) to accommodate a ⅜″ cavity comprising a ⅜″ drilled hole thru the cylinder axis at an angle of 66° therewith. This feeder was tested in feeding particulate chromium oxide catalyst to a polymerization process and was found to be very efficient.

One advantage in the feeder of the construction of Figures 2 and 3 lies in the fact that the catalyst material (which is abrasive) is carried only about 60° before being delivered to the outlet conduit. This decreases the tendency of the catalyst to migrate along the surface of the cylinder and thereby reduces erosion of the feeder and cuts operating costs of the process.

Occasionally some polymer is formed in the feeder itself when 1-olefin feed passes upwardly into the feeder where it contacts catalyst particles under reaction conditions. When this occurs, it is necessary to remove the feeder cylinder and clear the polymer from the cylinder and feeder parts. The arrangement of the feeder elements of the feeders disclosed permits easy removal of the feeder cylinder and shaft by merely removing the four cap screws holding the end plate on, loosening the set screw holding the outer end of the shaft in the gear box attachment, and withdrawing the cylinder-shaft assembly thru the open end of the housing without disturbing the sealing assembly and bearing cap on the opposite end of the housing. The feeder is also readily reassembled after cleaning.

Certain modifications of the invention will become apparent to those skilled in the art and the illustrative details disclosed are not to be construed as imposing unnecessary limitations on the invention.

I claim:

1. A feeder for controlled feeding of particulate solids which comprises in combination a rotatable solid cylinder having at least one cavity in its cylindrical surface extending inwardly therefrom; a close fitting housing around said cylinder; inlet conduit means thru an upper section of said housing and outlet conduit means thru a lower section of said housing, said inlet means and said outlet means being disposed so that as said cylinder is rotated continuously in one direction said cavity alternately coincides with their inner ends to receive and deliver, respectively, particulate solids; a shaft of smaller diameter than said cylinder attached coaxially to one end thereof providing an annular shoulder on said cylinder adjacent said shaft, said shaft extending out thru said housing; a thrust bearing in said housing adapted to engage said annular shoulder; a shaft bearing around said shaft in said housing spaced from said cylinder; a chevron type packing seal around said shaft intermediate said thrust bearing and said shaft bearing, said seal being spring urged toward said shaft bearing and adapted to seal against substantial internal fluid pressure loss; and an annular bearing around the end of said cylinder remote from said shaft.

2. The feeder of claim 1 including a plurality of uniformly spaced cavities in the periphery of said cylinder intermediate its ends and spaced apart therefrom, said cavities being progressively smaller towards the axis of the cylinder.

3. The feeder of claim 1 wherein said housing is provided with a capped and sealed opening adjacent the end of said cylinder of larger diameter than said cylinder to permit removal of said cylinder and shaft therethru.

4. The feeder of claim 2 including means for flushing catalyst particles from said cavities comprising a conduit thru said housing directed obliquely toward the area of said cylinder in which said cavities are positioned when in delivering position.

5. A feeder for particulate solids comprising a rotatable cylinder having a receiving conduit extending obliquely therethru with respect to the axis of said cylinder with its ends opening thru opposite sides of the cylindrical surface of said cylinder so as to rotate thru spaced apart planes perpendicular to said axis; a housing around said cylinder having a first inlet conduit above said cylinder positioned in one of said planes; a delivery conduit in said housing below said cylinder which aligns with said receiving conduit when same is out of alignment with first said inlet conduit; and a second inlet conduit positioned above said cylinder to align with said receiving conduit when same is in alignment with said delivery conduit.

6. The feeder of claim 5 including fluid flushing means in said second inlet conduit.

7. The feeder of claim 5 wherein said outlet conduit is offset axially to align with the end of said receiving conduit which rotates thru a plane remote from said inlet conduit, whereby said receiving conduit is in a filling position and in delivering position only once in 360° rotation.

8. The feeder of claim 5 wherein said housing is provided with a circuit of heat exchange conduits intermediate its inner and outer walls.

9. The feeder of claim 5 wherein said second inlet conduit is positioned in the same perpendicular plane as said solids inlet conduit so that less than 180° of rotation is required to place said receiving conduit in position for flushing.

10. The structure of claim 5 wherein the inlet conduits are spaced apart circumferentially on opposite sides of the extended vertical diameter of said cylinder and up to about 45° therefrom.

11. The feeder of claim 5 wherein said second inlet conduit is positioned in the other perpendicular plane to that in which said solids inlet is positioned.

12. The structure of claim 11 wherein the inlet conduits align with the oblique receiving conduit of said cylinder when one of its ends is in substantially its uppermost position.

References Cited in the file of this patent
UNITED STATES PATENTS

| | | |
|---|---|---|
| 1,020,743 | Burlingham | Mar. 19, 1912 |
| 1,375,643 | Skinner | Apr. 19, 1921 |
| 2,274,003 | Sheppard | Feb. 24, 1942 |
| 2,614,891 | Colburn | Oct. 21, 1952 |
| 2,669,506 | Weber | Feb. 16, 1954 |